United States Patent [19]
Yamanaka et al.

[11] 3,835,945
[45] Sept. 17, 1974

[54] DEVICE FOR WEIGHING RUNNING VEHICLE

[75] Inventors: Masami Yamanaka, Miki; Yasutoshi Masuda, Ashiya, both of Japan

[73] Assignee: Yamato Scale Company, Limited, Hyogo-ken, Japan

[22] Filed: Jan. 14, 1974

[21] Appl. No.: 433,261

[30] Foreign Application Priority Data
Mar. 12, 1973  Japan.............................. 48-28655

[52] U.S. Cl............................ 177/134, 177/DIG. 8
[51] Int. Cl............................................ G01g 19/02
[58] Field of Search................ 177/134, 163, DIG. 8

[56] References Cited
UNITED STATES PATENTS

| | | | |
|---|---|---|---|
| 2,914,310 | 11/1959 | Bahrs | 177/163 X |
| 3,276,525 | 10/1966 | Cass | 177/134 X |
| 3,700,055 | 10/1972 | Gaulier | 177/134 X |

*Primary Examiner*—George H. Miller, Jr.

[57] ABSTRACT

A device for measuring the weight of a moving vehicle by measuring either the wheel load or axle load and avoiding inaccuracies due to vibration through the use of means for producing two signals proportioned to the downward force on the near and far edges of a platform as the wheel or wheels pass over it and then averaging the weight for a period initiated when the ratio of said signals has a first value and terminating when the ratio of said signals has a second value.

4 Claims, 5 Drawing Figures

DEVICE FOR WEIGHING RUNNING VEHICLE

This invention relates to a device for weighing a moving vehicle. The device of this invention is applicable for measuring not only the total weight of the vehicle but also a partial weight such as axle load or wheel load. The term "axle load" means the load on each wheel axle, that is each pair of wheels and the "wheel load" means the load on each wheel.

In the case of weighing an automobile before entering a road or a bridge having a predetermined weight restriction, it is desirable and often necessary to weigh it instantaneously while it is moving at high speed. Known prior art devices proposed for this purpose include a platform installed in the road surface and a load detecting unit such as a piezoelectric load cell for converting the load applied to the platform into an electric signal which is further amplified and indicated at a weight scale. Due to the vibration of the moving vehicle, however, the electric signal contains a substantial pulsating component which severely affects the accuracy of measurement. In order to reduce the influence of vibration, it has been proposed to average the electric signal throughout a specific time period for which the load is fully on the platform. However, no satisfactory solution has been found because of the trouble in detecting the position of the vehicle.

Therefore, an object of this invention is to provide an improved device for weighing a moving vehicle at high accuracy by adopting a novel position detecting system.

According to this invention, the device comprises a platform installed in the road surface, means for detecting loads applied to both end portions of said platform along the running direction of the vehicle as for instance a pair of electric signals, means for detecting the time period between a first time point at which the ratio of said pair of electric signals has a first predetermined value and a second time point at which said ratio has a second predetermined value, and means for averaging the sum of said pair of electric signals throughout said time period.

As the device of this invention can detect the abovementioned averaging time period only from the load applied to the platform and needs no additional means, such as a photoelectric detector for sensing the position of vehicle, the abovementioned difficulties with prior art devices have been overcome.

Other features and operation of the device of this invention will be described in detail hereinunder with reference to the accompanying drawings.

In the drawings.

Throughout the drawings, like reference numerals are used to denote like structural components.

Figure 1:
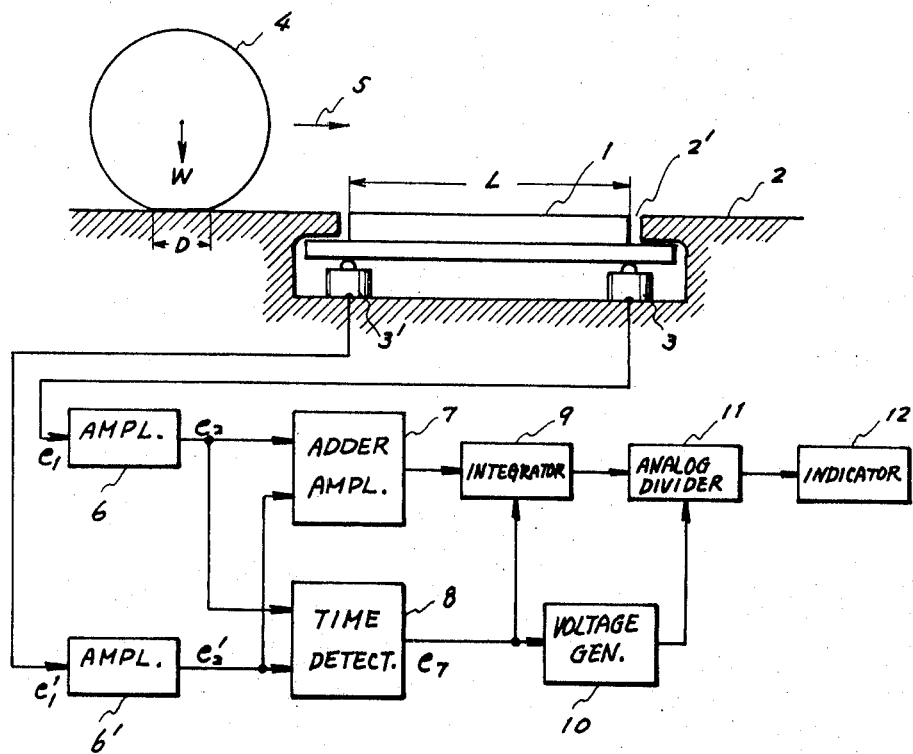
FIG. 1 is a schematic diagram, partly in block form, of an embodiment of a wheel load meter according to this invention.
Figure 2:
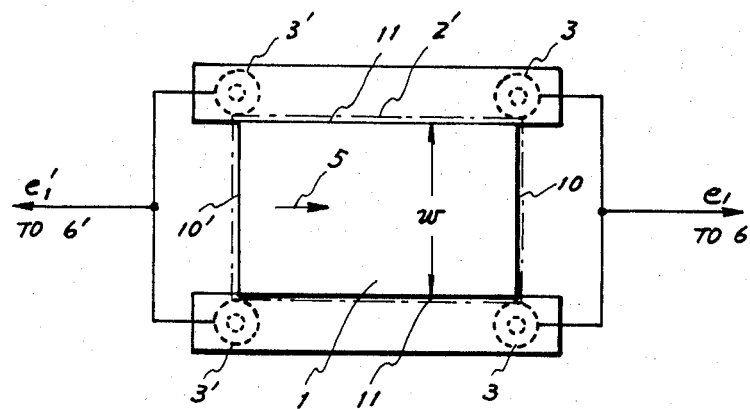
FIG. 2 is a schematic plan view of the platform structure of the device of FIG. 1.

Referring now to FIGS. 1 and 2, a rigid rectangular platform 1 having a length L and a width $w$ is disposed in a rectangular hole 2' (shown in phantom in FIG. 2) formed in a road surface. Two pairs of piezoelectric load cells 3 and 3' are located under the platform 1 at the respective corners thereof. Assuming that a wheel 4 such as automobile tire having a wheel load W and a contact width D moves in the direction of the arrow 5 from the lefthand side of the drawing and one pair of load cells 3 are positioned in coincidence with the forward or far edge 10 of the platform 1 and the other pair of load cells 3' are positioned in coincidence with the rear or near edge 10' thereof. In order to avoid overhanging difficulties, all of the load cells are positioned beyond the both side edges 11 of the platform 1 as shown in FIG. 2. In the case of wheel load meter, the length L of the platform 1 is selected less than the axle interval of the automobile and the width $w$ is selected less than the wheel interval thereof, but they must be large enough to include the contact face of the wheel 4.

The respective pairs of load cells 3 and 3' are connected together as shown in FIG. 2 and applied to amplifiers 6 and 6' as inputs $e_1$ and $e_1'$. The amplified outputs $e_2$ and $e_2'$ of the amplifiers 6 and 6' are applied to an adder amplifier 7 to form a sum signal representing the wheel load and, at the same time, applied to a time detector 8 of this invention to form a control signal $e_7$ representing the abovementioned average time period. The sum signal from the adder amplifier 7 is applied to an integrator 9 and integrated under control of the signal $e_7$ throughout the corresponding time period. The control signal $e_7$ is also applied to a voltage generator 10 to form a voltage proportional to the abovementioned time period, and the output of the integrator 9 is applied to an analog divider 11 and divided by the output voltage of the generator 10 to produce an average output. The average output is indicated by an indicator 12 at a weight scale.

Now, the principle of the device of this invention will be described with reference to FIG. 3.

Figure 3:
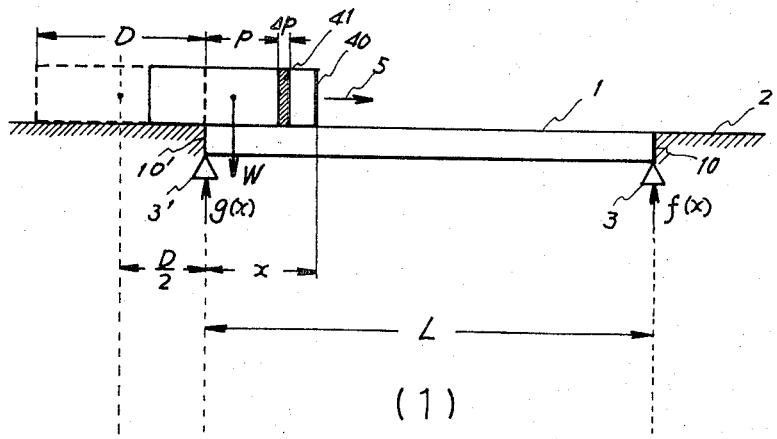
FIG. 3 is a set of diagrams for explaining the principle and operation of the device of this invention.
Figure 3:
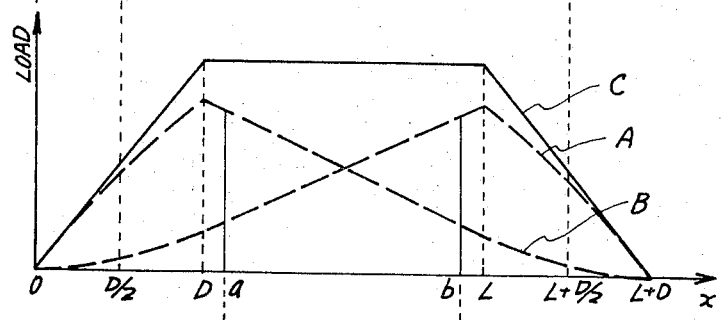
Figure 3:
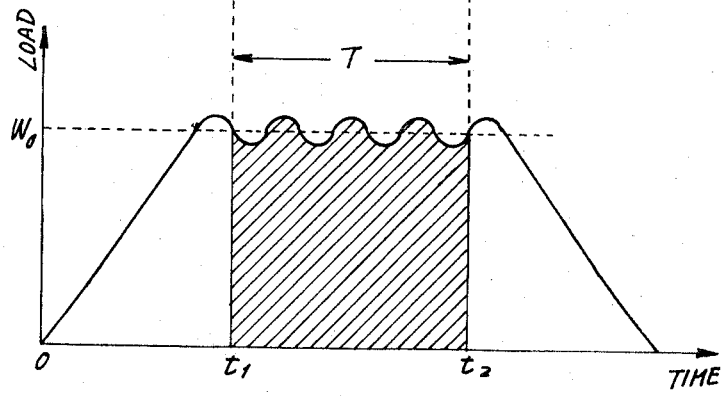

An assumption is made such that the wheel load W of the wheel 4 having a contact width D as shown in FIG. 1 can be substituted by an equivalent distributed load W as shown in FIG. 3(1), the equivalent load being represented by a block 40 having a length D and the weight of the wheel load W of the wheel 4. Movement of the block 40 across the platform 1 to the load cells 3 and 3' is exactly same as the effect of the wheel 4 moving across the platform 1. Considering such a case as shown in FIG. 3(1) in which the front edge of the block 40 is at a distance $x$ from the near edge 10' of the platform 1, the loads detected by the load cells 3 and 3' are given as functions of $x$, $f(x)$ and $g(x)$, respectively. The functions can be derived in the following manner.

An infinitesimal portion 41 of the block 40, which is at a distance $p$ from the near edge 10' of the platform 1 and has an infinitesimal length $\Delta P$, has a weight $W/D \, \Delta P$ and this weight is allotted proportionally to the load cells 3 and 3'. That is, the allotment to the cell 3 is $W/D \cdot P/L \, \Delta P$ and that to the cell 3' is $W/D \cdot L-P/L \, \Delta P$. The functions $f(x)$ and $g(x)$ can be derived by integrating these allotments throughout the portion of the block 40 which is on the platform 1.

When $0 \leq x \leq D$.

$$f(x) = \int_0^x \frac{W}{D} \cdot \frac{P}{L} dp = \frac{W}{2DL} x^2 \quad (1)$$

$$g(x) = \int_0^x \frac{W}{D} \cdot \frac{L-P}{L} dp = \frac{W}{2DL} x(2L-x) \quad (2)$$

When $D \leq x \leq L$, $$f(x) = \int_{x-D}^x \frac{W}{D} \cdot \frac{P}{L} dp = \frac{W}{2L}(2x-D) \quad (3)$$

$$g(x) = \int_{x-D}^x \frac{W}{D} \cdot \frac{L-P}{L} dp = \frac{W}{2L}(2L+D-2x)$$

When $L \leq x \leq L + D$, (4)

$$f(x) = \int_{x-D}^L \frac{W}{D} \cdot \frac{P}{L} dp = \frac{W}{2DL}(D+L-x)(L+x-D)$$

(5)

$$g(x) = \int_{x-D}^L \frac{W}{D} \cdot \frac{L-P}{L} dp = \frac{W}{2DL}(D+L-x)^2 \quad (6)$$

Selecting the origin at the position of the center of gravity of the block 40 and plotting the distance $x$ on the abscissa and the loads $f(x)$ and $g(x)$ on the ordinate, broken curves A and B are obtained for the functions $f(x)$ and $g(x)$ respectively and a solid curve C is obtained for the sum of the both functions $f(x) + g(x)$. The curve C is a theoretical representation of the output of the adder amplifier 7 of FIG. 1.

Due to the vibration of the vehicle body and other disturbances, however, the practical output of the adder amplifier 7 exhibits a form as shown in FIG. 3 (3) with respect to time. It is obviously recommendable to average the output of the adder amplifier 7 within a time interval T between time points $t_1$ and $t_2$ which does not include the leading edge and the trailing edge of the output waveform in order to obtain an accurate and reliable value of the load. In addition to the above condition, it is also obvious that the time interval T should be selected as wide as possible in order to improve the accuracy. A novel and improved method of selecting these time points $t_1$ and $t_2$ forms part of the subject matter of this invention.

Plotting $a$ and $b$ on the abscissa of FIG. 3(2) as the positions of the center of gravity of the block 40 in correspondence with the time points $t_1$ and $t_2$ of FIG. 3(3). the above conditions can be translated to select the positions $x = a$ and $x = b$ as close as possible to the positions $x = D$ and $x = L$ respectively within the range $D \leq x \leq L$. In this range, the following relation can be derived from Equations (3) and (4).

$$x = (L/\phi(x) + 1) + D/2 \text{ where } \phi(x) = g(x)/f(x) \quad (7)$$

The equation (7) teaches that, if L and D are constants, the position $x$ is fixed regardless of the load W to be measured by fixing the ratio of both functions $f(x)$ and $g(x)$. The length L of the platform is essentially fixed but the contact width D of the wheel may vary with each vehicle and each wheel load. However, the practical variation of the contact width D is not large enough to affect the value of $x$ and, even if so, the resultant accuracy is not affected by a small variation of the time interval T as long as the pulsation or vibration of the output waveform is uniform throughout the above range.

According to this invention, the positions $a$ and $b$ and corresponding ratios $f(a)/g(a)$ and $f(b)/g(b)$ are appropriately selected previously and these ratios are preset in the time detector 8 in FIG. 1. The amplified outputs $e_2$ and $e_2'$ from the amplifiers 6 and 6', which correspond to the functions $f(x)$ and $g(x)$, are processed into a ratio $e_2/e_2'$ and compared with the preset ratios in the time detector 8, so that the signal $e_7$ representing the time points $t_1$ and $t_2$ of FIG. 3(3) is produced. The integrator 9 integrates the sum output of the adder amplifier 7 under control of the signal $e_7$ and produces an output corresponding to the shadowed area of FIG. 3(3). The voltage generator 10 converts the signal $e_7$ into a voltage output in the analog divider 11, so that a quotient output corresponding to the average load $W_0$ (FIG. 3(3)) is produced therefrom.

Figure 4:
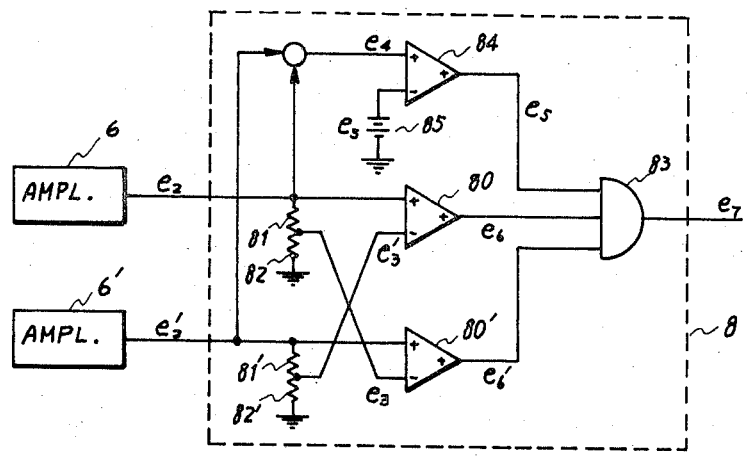
FIG. 4 is a schematic circuit diagram representing an embodiment of the time detector shown in FIG. 1.
Figure 5:
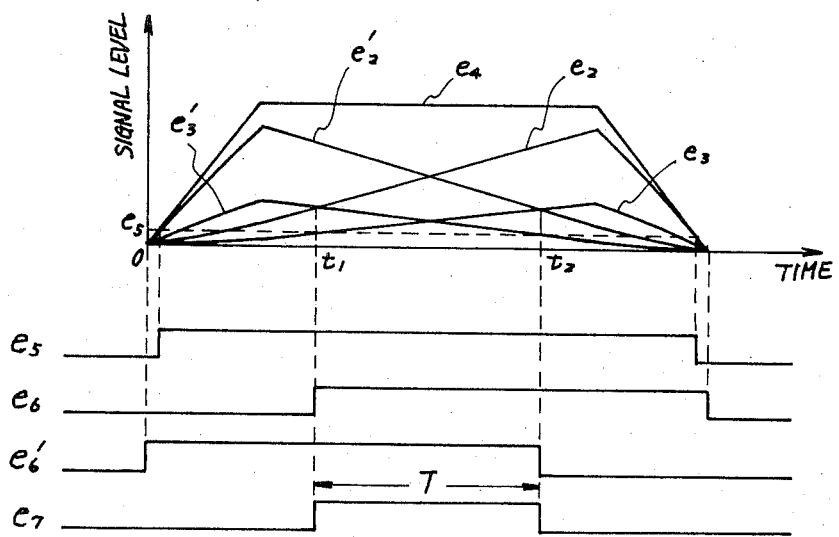
FIG. 5 is a diagram representing various signal forms appearing at various circuit points in FIGS. 1 and 4.

FIG. 4 shows an embodiment of circuit configuration of the time detector 8 according to another feature of this invention. The outputs $e_2$ and $e_2'$ of the amplifiers 6 and 6' (FIG. 1) are connected to the PLUS-inputs of comparators 80 and 80', respectively. These PLUS-inputs are respectively grounded through a series connection of resistors 81 and 82 and a series connection of resistors 81' and 82'. The connection point of the resistors 81 and 82 is connected to the MINUS-input of the comparator 80' and the connection point of the resistors 81' and 82' is connected to the MINUS-input of the comparator 80. The values of the resistors 81, 82, 81' and 82' are previously selected such that ratios $e_3/e_2$ and $e_3'/e_2'$ take a predetermined value (e.g. one-third) which corresponds to the abovementioned ratio of two functions, where $e_3$ and $e_3'$ are the MINUS-inputs of the comparators 80' and 80 respectively. The comparators 80 and 80' are constructed to produce an output of predetermined level when the PLUS-input has a higher level than the MINUS-input. The outputs $e_6$ and $e_6'$ of the comparators 80 and 80' are connected to an AND gate 83 which produces an output $e_7$. Under these conditions, the signal levels of $e_2, e_2', e_3, e_3', e_6, e_6'$ and $e_7$ vary as shown in FIG. 5 and the and the output $e_7$ of the AND gate 83 or the time detector 8 represents the time points $t_1$ and $t_2$ defining the time period T.

Although the abovementioned arrangement is theoretically sufficient for deriving the control signal $e_7$ for the integrator 9 and the divider 11 of FIG. 1, it is not always sufficient for practical use. Because of mechanical disturbance and electrical noise, the above conditions may be fulfilled in the vicinities of the both ends 10 and 10' of the platform 1 (FIG. 2) to produce erroneous instantaneous outputs from the comparators 80 and 80'. In order to prevent such an occurrence, the time detector 8 of FIG. 4 includes an additional comparator 84 which is similar to the comparators 80 and 80'. The inputs $e_2$ and $e_2'$ are summed up as $e_4$ and applied to the PLUS-input of the comparator 84 and the MINUS-input of the comparator 84 is grounded through a potential source such as battery 85 having a level $e_s$. The output of the comparator 84 is connected to the AND gate 83. As no output is produced from the comparator 84 when $e_4$ is lower than $e_s$, the output of the comparator 84 is shown by $e_5$ in FIG. 5. Consequently, no output can be produced from the AND gate 83 in the vicinities of both ends and the abovementioned difficulty can be prevented.

As described above, the device of this invention can be constructed more simply at lower cost and exhibit higher accuracy than the prior devices since it requires no additional equipment such as a mechanical switch or photoelectric sensor for sensing the position of the vehicle on the platform and can derive it electrically at high accuracy only from the outputs of the load cells co-operating with the platform. It is a further feature of this invention that measurement can be effected regardless of the direction of movement of the vehicle since the construction of the device is completely symmetrical in the both forward and backward directions.

Although the above description was made in conjunction with a wheel load meter, it should be understood that the invention can be applied to various weighing devices for moving vehicles. For example, by appropriately selecting the length and width of the platform, the device of this invention can be used not only as an axle load meter but also a total weight meter for moving vehicles.

We claim:

1. A device for weighing a moving vehicle, comprising a platform installed in the path of said vehicle, means for detecting loads applied by said vehicle to both ends portions of said platform along the moving direction as first and second electric signals, means for detecting the time period between a first time point at which the ratio of said first and second signals has a first predetermined value and a second time point at which said ratio has a second predetermined value, and means for averaging the sum of said pair of electric signals throughout said time period.

2. A device according to claim 1, wherein said time period detecting means comprises first and second comparators, said first comparator receiving said first electric signal at its first input and said second comparator receiving said second electric signal at its first input, means for supplying a part of said first electric signal to the second input of said second comparator and supplying a part of said second electric signal to the second input of said first comparator, and an AND circuit receiving the outputs of said first and second comparators at its first and second inputs.

3. A device according to claim 2, wherein said time period detecting means further comprises a third comparator receiving the sum of said first and second electric signals at its first input and a predetermined potential at its second input, the output of said third comparator being connected to the third input of said AND circuit.

4. A device according to claim 1, wherein said averaging means comprises an adder for summing up said first and second electric signals to produce a sum signal, an integrator for integrating said sum signal throughout said time period detected by said time period detecting means, a voltage generator for generating a voltage proportional to said time period, and an analog divider for dividing the output of said integrator by said voltage output from said voltage generator.

* * * * *